Oct. 15, 1935.  S. F. ZUCK  2,017,333

FISH LURE

Filed Nov. 30, 1932

INVENTOR.
Stanley F. Zuck.
BY George J. Oltsch
ATTORNEY.

UNITED STATES PATENT OFFICE 2,017,333

FISH LURE

Stanley F. Zuck, Ann Arbor, Mich., assignor to South Bend Bait Company, South Bend, Ind.

Application November 30, 1932, Serial No. 645,014

15 Claims. (Cl. 43—40)

The invention relates to fish lures, and particularly to a lure by which a live bait is carried.

In prior lures of this character it has been customary to provide, in addition to the customary line attaching means and hooks, harness means for a minnow or other live bait of such character that the live bait is not killed thereby. The object of the use of such harness means has been to permit the live bait to have its natural movement in the water by which to attract the fish to the lure. These lures have generally proven ineffective however, since no harnessing means by which the bait may be held on the lure without killing the same have been provided; the various constructions employed either being ineffective to hold the live bait if they do not kill it, or killing the live bait if they are effective in retaining the same on the lure. In either case, the effectiveness of the lure is lost.

In other types of previous constructions wherein the live bait is intentionally so impaled in securing it to the lure that it is killed, a large measure of their effective fish-attracting characteristics are lost. Spinners are generally employed with such lures to agitate the water and to provide an attractive action in place of a natural swimming action. However, even in these constructions, no means is provided for so holding the live bait that it may be retained when the lure is cast.

I have provided a lure which overcomes all the above objections to and difficulties experienced with lures of this type.

Accordingly, it is the principal object of my invention to provide a lure of this character which will have a life-like swimming movement when drawn through the water in casting or trolling.

A further object is to provide a lure of this character to which a live bait may be secured and which has an erratic side-to-side movement when drawn through the water regardless of whether the bait is dead or alive.

A further object is to provide a lure of this character having a life-like swimming movement when drawn through the water and provided with either natural or artificial bait.

A further object is to provide a lure of this character with live bait impaling means by which the bait is effectively retained on the lure to permit the same to be cast or trolled without losing said bait.

A further object is to provide a lure of this character for carrying live bait wherein the live bait counterweighs the lure to prevent spinning of the lure when drawn through the water.

A further object is to provide a lure of this character wherein the line attaching means is off-set above the longitudinal center of the body of the live bait carried by the lure.

With the above and other objects in view, the invention resides in the combination and arrangement of parts as hereinafter set forth, shown in the drawing, described and claimed, it being understood that changes may be made in the precise embodiment of the invention without departing from the spirit of the invention.

Figure 1:
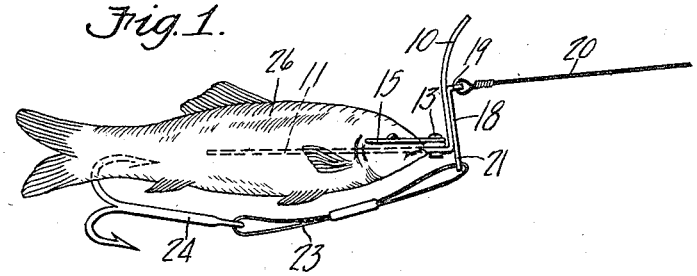
Figure 1 is a side view of the lure with a live minnow impaled thereon.
Figure 2:
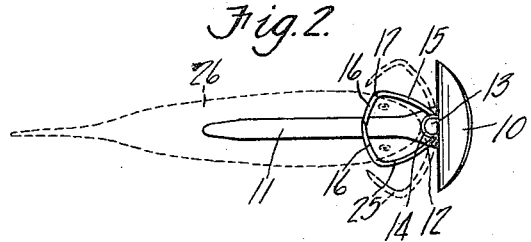
Figure 2 is a top plan view of a portion of the lure.
Figure 3:
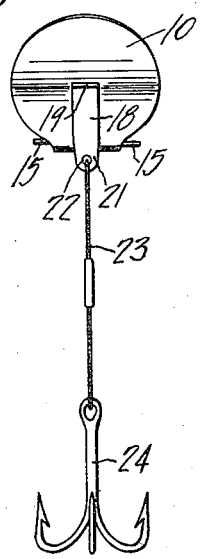
Figure 3 is a view of the lure in front elevation.
Figure 4:
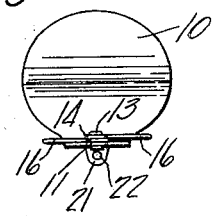
Figure 4 is a view of a portion of the lure in rear elevation.

Referring to the drawing, which illustrates the preferred embodiment of the invention, the numeral 10 designates a plate of substantially circular configuration which is preferably bent to provide a forwardly disposed vertically concaved face. Integrally formed with the plate 10 and extending angularly rearwardly therefrom is an impaling member 11 of substantial length. The front portion 12 of impaling member 11 is provided with angularly outwardly directed sides to provide an enlarged portion for receiving rivet 13. A pair of hooks 25 are pivotally carried by the rivet 13, and each comprises a looped end 14 encircling rivet 13, a curved intermediate portion 15, and a curved outer impaling portion 16, said hook being sharply bent at 17 between portions 15 and 16 whereby the outer portion 16 extends substantially concentrically of rivet 13.

A plate 18 is secured to the front face of plate 10 by soldering or welding and extends vertically centrally of plate 10. The upper end of plate 18 is forwardly bent at 19 and is provided with a suitable aperture (not shown) through which line 20 may extend and be secured. The lower end 21 of plate 18 extends in spaced relation below plate 10 and is provided with an aperture 22. To the lower end 21 of plate 18 is secured a flexible wire 23 by means of aperture 22, and this wire carries hook 24, preferably a triple hook.

A live bait, such as a minnow 26, is preferably used with the lure and is impaled on impaling member 11 by passing said member through the mouth of the minnow and centrally through the body of the minnow to bring the head of the minnow close to rivet 13. The hooks 25 are then pivoted in the direction of each other to impale the head of the minnow, said hooks preferably piercing the head in or in back of the gills. It will be seen that the curvature and positioning of the portions 16 of the hooks 25 whereby they are concentric of the rivet 13 to which the hooks are pivoted permits the hooks to be pivotally inserted in the minnow head from opposite sides thereof without tearing the head of the minnow. The pivotal hooks 25 are preferably tightly engaged by rivet 13 so that they will maintain their position without working loose. One of the pointed ends of triple hook 24 is then inserted in the rear under side of the minnow, which serves both to further secure the minnow on the lure and to effectively position the other pointed ends of hook 24. It will thus be seen that the minnow is effectively held on the lure by impaling member 11 passing centrally therethrough, by the pair of pivotal hooks 25 passing into the head from the sides, and by hook 24 in the rear under side of the minnow. By these four impaling means the minnow is effectively held in a manner to permit the lure to be cast repeatedly without losing the minnow, and, in fact, it has been found that the lure may be so cast for several hours before it is necessary to replace the minnow.

Obviously the various impaling means employed quickly kill the minnow, but this has been found to present no objection to the lure, since it has a natural lateral darting reciprocatory or swimming action when drawn through the water. The line is attached to part 19 of plate 18 which is above the minnow. In this way the minnow serves as a counterbalance for the upwardly extending plate 18 and prevents the lure from spinning or rotating about the point of line attachment. This counterbalancing thus operatively positions plate 10 at all times, tends to hold the rear end of the minnow in about the same level at the head thereof, prevents the lure from spinning, and eliminates the necessity of keeping the minnow alive to obtain the desired swimming action. It will be obvious for this purpose that the line attaching means need not be disposed centrally of the plate 10, but may be attached at any point sufficiently above the center line of the lure to provide the desired counterbalancing of the plate 10 by the weight of the minnow.

While the invention has been described and illustrated as used with live minnows, it has been found to function satisfactorily when artificial minnows made of flexible material, such as rubber, and sufficiently heavy to provide the desired counterbalancing action, are employed. Care must be exercised in the selection of such artificial baits, however, since the weight thereof must be sufficient to provide the proper counterbalancing while at the same time avoiding the undesirable motion retarding or deadening effect of an artificial bait which is too heavy. The illustrated means for attaching the minnow to the lure may be employed with such artificial minnows, or the same may be moulded or otherwise permanently secured to the impaling member 10 or its equivalent.

The invention having been set forth, what is claimed as new and useful is:

1. In a minnow-holding fish lure, an upright concavo-convex plate, line attaching means carried by said plate at an intermediate point thereof, an elongated minnow impaling member extending angularly rearwardly from the lower end of said plate, a pair of hooks pivoted to said impaling member adajcent said plate and each being provided with a pointed end portion substantially concentric of said pivot, a fish hook, and means secured to the lower end of said plate and carrying said fish hook.

2. In a fish lure for holding live bait, an upright plate, line attaching means intermediate said plate, a bait impaling member extending angularly rearwardly from the bottom edge of said plate, a pair of hooks pivoted to the forward end of said impaling member for impaling the head of the bait, a fish hook, and means secured to said plate and carrying said fish hook.

3. In a fish lure for holding live bait, an upright, line attaching means intermediate said plate, a bait impaling member extending angularly rearwardly from the bottom edge of said plate, a pair of hooks pivoted to the forward end of said impaling member for impaling the head of the bait, and a fish hook disposed adjacent the rear end of said lure.

4. In a fish lure for holding live bait, an upright plate, means carried by the lower end of said plate for impaling live bait including a pair of pivoted hooks having inwardly bent end portions, a fish hook carried by said lure, and line attaching means spaced above the forward end of said bait-holding means.

5. In a fish lure, a substantially upright water resistance member, line attaching means carried by said member, and means carried by said member for holding a bait below the level of said line attaching means, said last named means including a pair of pivoted hooks each being provided with an angular pointed end portion for impaling the forward end of said bait at opposite sides thereof.

6. In a fish lure for holding live bait, an upright plate, impaling means carried by said plate for impaling a bait at one of its ends, an elongated flexible member carried by the lower end of said plate, a multipronged fish hook carried by said flexible member and adapted to impale the other end of said bait, and line attaching means spaced above said impaling means.

7. In a fish lure, an upright water resistance member, a bait extending rearwardly of said member at the lower end thereof and secured thereto, a fish hook connected to said member, and line attaching means carried by and positioned intermediate the height of said upright member and above said bait.

8. In a fish lure, means for holding a live bait, a transverse water resistance member extending upwardly from said bait-holding means, and line attaching means spaced above said live bait and intermediate the vertical dimension of said member.

9. In a fish lure, means for holding a bait, a substantially vertical water resistance member extending upwardly from the forward end of said bait-holding means, a fish hook connected to said member, and line attaching means disposed intermediate the top of said member and the center of gravity of said lure, said water resistance member being disposed at an angle to the normal path of movement of said lure to provide a lateral reciprocatory movement when the lure is drawn through the water.

10. In a fish lure, means for fixedly holding a bait in substantially horizontal position, means extending upwardly from said bait-holding means to provide a forward concaved water resisting face extending transverse of said bait, a fish hook connected to said last named means, and line attaching means carried by said upwardly extending means and disposed above said bait-holding means and the bait carried thereby whereby the major portion of the weight of the lure is below and a minor portion of said weight is above said line attaching means to hold said bait lowermost and to provide lure oscillations of small amplitude when the lure is drawn through the water.

11. A fish lure for holding live bait comprising a substantially upright water resistance plate, a line secured to said plate intermediate the height thereof, a member extending angularly rearwardly from the bottom edge of said plate for impaling a live bait to position said bait at the level of the lower end of said plate and below said line, and a hook connected to said plate.

12. In a fish lure for holding live bait, a member for longitudinally impaling the live bait, an upwardly directed plate carried by the forward end of said impaling member, a hook connected to said plate, and line attaching means carried by said plate above said impaling member, said plate being positioned transverse of said lure to impart bait-simulating movement to said lure as it is drawn through the water.

13. In a fish lure for holding live bait, an upright transverse water resistance plate, means extending longitudinally rearwardly of said plate at the lower end thereof for holding the live bait in substantially horizontal position partially projecting below said plate, a fish hook connected to said plate, and the line attaching means carried by said plate above the level of said first named means.

14. In a fish lure for holding natural bait, means for holding said natural bait, a water resistance member extending angularly upwardly from said bait-holding means at the forward end thereof, a fish hook carried by said lure, and line attaching means secured to said member and positioned in upwardly spaced relation to said bait holding means and the bait carried thereby, said water resistance member imparting bait simulating movement to said lure as it is drawn through the water.

15. In a fish lure for holding a bait, an upright water resistance member, and flexible means connected adjacent to the lower end of said member and extending rearwardly therefrom for maintaining the rear end of the bait in secured relation to said member.

STANLEY F. ZUCK.